US 8,965,453 B2

(12) United States Patent
Oyman (10) Patent No.: US 8,965,453 B2
(45) Date of Patent: Feb. 24, 2015

(54) PACKET STREAMING SERVICE CAPABILITY EXCHANGE FOR ENHANCED PERIPHERAL DEVICE SUPPORT

(75) Inventor: Ozgur Oyman, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/598,301

(22) Filed: Aug. 29, 2012

(65) Prior Publication Data

US 2013/0190048 A1    Jul. 25, 2013

Related U.S. Application Data

(60) Provisional application No. 61/589,774, filed on Jan. 23, 2012.

(51) Int. Cl.
| | |
|---|---|
| *H04B 1/38* | (2006.01) |
| *H04M 3/00* | (2006.01) |
| *H04M 3/42* | (2006.01) |
| *G06F 3/00* | (2006.01) |
| *G09G 5/00* | (2006.01) |

(52) U.S. Cl.
USPC ........ 455/557; 455/414.1; 455/418; 715/744; 345/619

(58) Field of Classification Search
USPC ............. 455/557, 414.1, 418–420, 566; 715/500.1, 201–204, 744–747; 345/619, 660, 472
See application file for complete search history.

(56) References Cited

U.S. PATENT DOCUMENTS

| | | | | |
|---|---|---|---|---|
| 2008/0092168 | A1* | 4/2008 | Logan et al. .................. | 725/44 |
| 2009/0063703 | A1* | 3/2009 | Finkelstein et al. .......... | 709/240 |
| 2009/0233587 | A1* | 9/2009 | Muhonen et al. ........... | 455/414.1 |
| 2010/0142517 | A1* | 6/2010 | Montemurro et al. ........ | 370/352 |
| 2011/0035768 | A1* | 2/2011 | Ling et al. .................... | 725/28 |
| 2012/0007875 | A1* | 1/2012 | Sethuraman et al. ......... | 345/545 |

OTHER PUBLICATIONS

NPL 3GPP TS 26.234 v10.1.0 release 10 ETSI TS 126 234 V 10.1.0 (Jun. 2011) UMTS; LTE; Transparent end to end Packet switched Streaming Service (PSS) Protocols and codecs (3GPP TS 26.234 version 10.1.0 Release 10).*
RDF Vocabulary Description Language 1.0 RDF Schema W3C RDF Vocabulary Description Language 1.0: RDF Schema W3C Recommendation Feb. 10, 2004.*

* cited by examiner

*Primary Examiner* — Michael Mapa
(74) *Attorney, Agent, or Firm* — Schwegman Lundberg & Woessner, P.A.

(57) ABSTRACT

Systems and techniques for packet streaming service capability exchange for enhanced peripheral device support are described herein. A profile difference may be received from user equipment. The profile difference may include a device attribute. A current profile may be modified with the device attribute to create a modified profile. A determination may be made as to whether a content session parameter will change based on the modified profile.

27 Claims, 5 Drawing Sheets

PACKET STREAMING SERVICE CAPABILITY EXCHANGE FOR ENHANCED PERIPHERAL DEVICE SUPPORT

CLAIM OF PRIORITY

This patent application claims the benefit of priority, under 35 U.S.C. §119(e), to U.S. Provisional Patent Applicant Ser. No. 61/589,774, titled "ADVANCED WIRELESS COMMUNICATION SYSTEMS AND TECHNIQUES," filed Jan. 23, 2012, which is hereby incorporated by reference in its entirety.

BACKGROUND

Content delivery services, such as multimedia content streaming and conversational services, have become an important component of consumer demand in mobile data services. In an example, content consumer device, such as mobile user equipment (UE), may connect to these content delivery services to deliver content to a user on the device. Example content delivery services may include packet-switched streaming (PSS) and Multimedia Broadcast Multicast Service (MBMS), as discussed in the 3rd Generation Partnership Project (3GPP) family of standards (e.g., 3GPP Long Term Evolution release 10, 3GPP standard 36.21× vb.x.x, release 11 and beyond).

In some examples, in order to begin a content presentation session (e.g., a video), one or more messages are passed between the content consumer device and the content delivery service. In an example, some services may acquire information about the content consumer device's capabilities. This information may be used by the content delivery service to modify one or more of what content is streamed, or how the content is streamed. The modification of the streaming content may provide a higher level of quality to the user, a more efficient use of network resources, or achievement of other goals.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Modern communication devices and systems increasingly include the capacity to provide increasingly sophisticated streaming content to users. For example, modern content consumer devices and consumer networks may provide the bandwidth to distribute sophisticated streaming content. However, the generally small screen sizes of and limited sound reproduction capabilities of, for example, mobile content consumer devices may not provide a platform capable of allowing a user to fully experience the streaming content.

Some content consumer devices may include one or more interfaces to content presentation devices. These content consumer devices may be able to interface between a content delivery service and the content presentation devices in order to render the streaming content. Examples of such content streaming devices may include television monitors, home theater systems, etc. Often, the capabilities of the content presentation device, such as the resolution or sound reproduction capabilities, differ from the abilities of the content consumer device. In these situations, the content streaming parameters selected by the content delivery service—for example, based on a device profile for the content consumer device—may not provide a very good user experience when the content is rendered by the content presentation device. Assessing the capabilities of the content presentation device and communicating those capabilities to the content delivery service may allow for a better user experience. Additionally, modifying the device profile for the content consumer device, while the content is being streamed, may allow a user greater control over their content experience. In an example, the modification to the device profile may be temporary, ending when a particular content presentation session ends. By providing the user to modify the device profile, from the device, addresses some shortcomings in some current content streaming systems.

Figure 1:
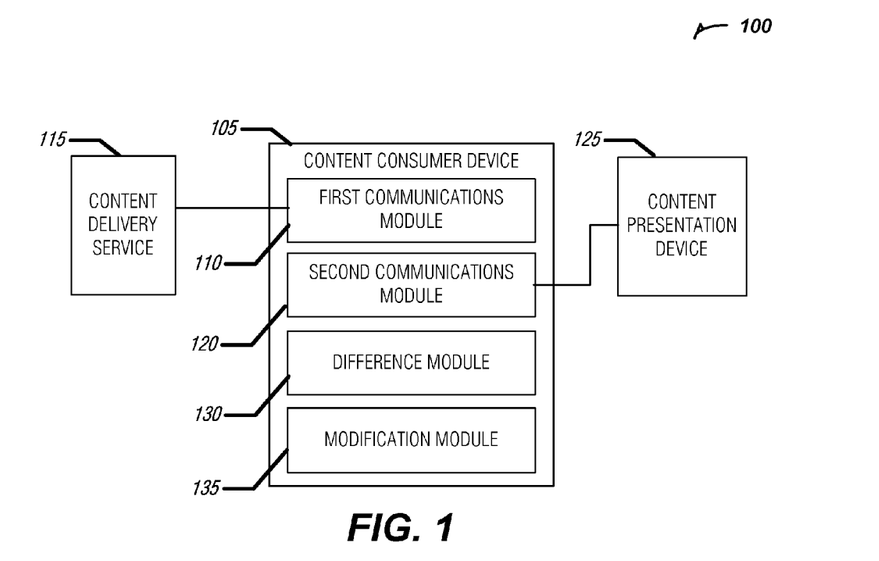
FIG. 1 illustrates an example of a system for packet streaming service capability exchange for enhanced peripheral device support, according to an embodiment.

FIG. 1 illustrates an example of a system 100 for packet streaming service capability exchange for enhanced peripheral device support, according to an embodiment. The system 100 may include a content consumer device 105, a content delivery service 115, and a content presentation device 125. The content consumer device 105 may include a first communications module 110, a second communications module 120, a difference module 130, and a modification module 135.

The first communications device 110 may be arranged to communicatively couple the content consumer device 105 and the content delivery service 115. In an example, the first communications module 110 may include hardware, software, or both arranged to access the content delivery service 115. For example, the first communications module 110 may comprise a digital subscriber line (DSL) transceiver arranged to connect to the Internet and communicate with the content delivery service. In an example, the first communications module 110 may comprise one or more radios and corresponding modulation hardware and software to communicate wirelessly for at least a part of the communications link between the content consumer device 105 and the content delivery service 115. In the example shown in FIG. 2 below, the first communications module 110 may comprise radios and encoding hardware and software to communicate with the content delivery service 115 using a cellular network.

The second communications module 120 is arranged to communicatively couple the content consumer device 105 to the content presentation device 125. In an example, the second communications module 120 may include one or more physical interfaces to the content presentation device 125. In an example, the physical interface may include a universal serial bus (USB) connection. In an example, the physical interface includes a high-definition multimedia interface (HDMI). In an example, the physical interface includes a component video interface. In an example, the physical interface includes an audio interface physically separated (e.g., not in the same cable sheath) from a video interface with which it operates.

The difference module 130 may be arranged to determine a difference between the content presentation device attribute for the content presentation device 125 and a corresponding device attribute in a device profile of the content consumer device 105. In an example, the difference module 130 is arranged to interrogate the content presentation device 125 to make the determination. For example, the modification module may make a request over HDMI to a television monitor about the processor of the television monitor. In an example, the corresponding device attribute in the device profile may not exist. For example, if the device profile does not have a PixelAspectRatio attribute, but the content presentation device 125 does, the PixelAspectRatio attribute is considered to be the corresponding device attribute in a device profile of the content consumer device 105.

In an example, the determined difference may correspond to a name and number of a device central processing unit (CPU). In an example, the determined difference may correspond to a CPU maximum speed in clock cycles per second. In an example, the determined difference may correspond to an indication whether a device provides device management (DM) capabilities. In an example, the determined difference may correspond to a version of a DM capability of a device. In an example, the determined difference may correspond to a bearer on which a current content presentation session was opened.

In an example, the difference module 130 may be arranged to determine the difference based on, and in response to, receiving user input. For example, the user may wish for the streaming content to be delivered in a mono speaker configuration rather than a stereo speaker configuration to save on bandwidth. The user may manipulate the content consumer device 105, or another device such as a remote-control, to deliver the mono selection. In response to receipt of this selection, the difference module 135 may determine the difference to be the selection. In an example, this determination, based on user input, may trigger the modification module 135 to communicate this difference.

In an example, the difference module 130 may be arranged to determine the difference during a content presentation session. For example, during the content presentation session includes anytime after the content presentation session has started and before the content presentation session has ended. In an example, the content presentation session may include a video, music, a picture slideshow, etc.

In an example, the difference module 130 may be arranged to determine a plurality of differences between content presentation device attributes for the content presentation device 125 and corresponding device attributes in the device profile for the content consumer device 105. In this way, multiple content presentation device attribute differences may be determined to increase the speed with which the user may better experience the streaming content.

The modification module 135 may be arranged to communicate the difference determined by the difference module 130 to the content delivery service 115. In an example, the modification module 135 may be arranged to communicate the difference to the content delivery service 115 using a HyperText transfer protocol (HTTP) get request. In an example, the modification module 135 may be arranged to initiate a session initiation protocol (SIP) subscribe message to the content delivery service. In this example, the content presentation session may be arranged to begin after receipt (e.g., at the content delivery service 115) of the SIP subscribe message. In an example, the difference may be communicated in the SIP subscribe message. In an example, the modification module 135 may be arranged to communicate the difference to the content delivery service 115 using a real-time streaming protocol (RTSP) describe message according to a 3GPP family of standards. Additional transfer mechanisms are described below with respect to FIGS. 3-5.

In an example, the difference may be arranged to modify a session parameter for a content presentation session. In an example, the difference may be arranged to temporarily modify the session parameters for the content presentation session. For example, the difference may be arranged to modify the session parameters until the content presentation session ends or a subsequent difference (corresponding to the first communicated difference) is communicated to the content delivery service 115. In this example, the content delivery service 115 is arranged to discard the temporarily modified session parameters. In an example, the difference, as received, may be known as a profile difference (ProfDiff).

In an example, the modification module 135 may be arranged to communicate the determined difference to the content delivery service 115 in response to the determination of the content presentation device attribute. For example, an interrupt (e.g., hardware or software based event model) may indicate that the content presentation device attribute has changed. This may occur if, for example, the content presentation device is muted. In this example, the communication of the content presentation device attribute to the content delivery service 115 may be driven by communication between the content consumer device 105 and the content presentation device 125 without user intervention.

In an example, when the difference module 130 is arranged to determine the difference during a content presentation session, the difference module 135 may be arranged to communicate the difference to the content delivery service 115. In an example, the communicated difference is arranged to modify content for the content presentation session. For example, if during the playing of a film, the screen resolution of the content presentation device 125 is determined to be greater than that of the content consumer device 105, the difference in resolutions may be communicated. Upon receipt of this difference, the content delivery service 115 is arranged to select a different video stream, or modify the current video stream, to take advantage of the greater screen resolution. Thus, the stream will change to be a higher-resolution version of that which was already being streamed.

In an example, the modification module 135, when a plurality of differences is determined by the difference module 130, may be arranged to communicate the plurality of differences to the content delivery service 115. In this example, each of the plurality of differences may be arranged to modify one or more session parameters for the content presentation session.

The content delivery service 115 may be arranged to receive the ProfDiff from the content consumer device 105. The content delivery service 115 may also be arranged to modify a current profile with a device attribute received in the ProfDiff to create a modified profile. The content delivery service 115 may be arranged to determine whether a content presentation session parameter will change based on the modified profile. For example, if the device attribute indicates a higher CPU capability than that in the current device profile, the content delivery service 115 may determine that a more sophisticated compression parameter can be used to stream the content. Thus, a determination is made to change the compression parameter. However, the content delivery service 115 may also determine that the content session in question is not encoded with the more sophisticate compression technique. In this case, although the modified profile is created, no change in the content session parameter would occur.

In an example, receipt of the ProfDiff may include a content presentation session request to which the ProfDiff applies. For example, the ProfDiff may be included in the request to begin streaming a concert. In an example, the content delivery service 115 may be arranged to discard the modified profile at the modified profile at the end of the content presentation session to which the ProfDiff applies. In an example, the content delivery service 115 may be arranged to modify the content presentation session parameter while the content presentation session is in-progress. This in-progress change may be made in response to the determination that the content presentation session parameter will change based on the modified profile. For example, even after the content presentation session has started, if the received device attribute leads to a content presentation session parameter change, that change may be applied once the determination is made.

In an example, a corresponding device attribute in the current profile that corresponds to device attribute may not be represented in the current profile. For example, there is not an entry in the current profile for the corresponding device attribute. The content delivery service 115 may be arranged to modify the current profile with the device attribute by adding the device attribute to the current profile—creating a representation of the corresponding device attribute—to create the modified profile. In an example, when the corresponding device attribute is represented, the content delivery service 115 may be arranged to modify the current profile with the device attribute by changing the corresponding device attribute in the current profile to the device attribute to create the modified profile.

Figure 2:
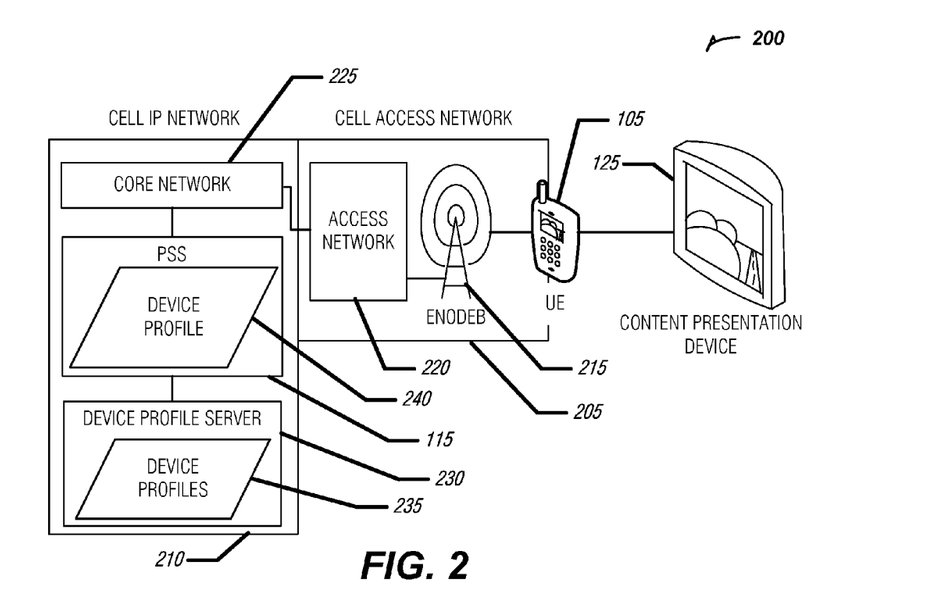
FIG. 2 illustrates an example of a system for packet streaming service capability exchange for enhanced peripheral device support using a cellular network, according to an embodiment.

FIG. 2 illustrates an example of a system 200 for packet streaming service capability exchange for enhanced peripheral device support using a cellular network, according to an embodiment. In an example, components of the system 200 may operate in accordance with a 3GPP family of standards. In this example, the content consumer device 105 may be a UE according to the 3GPP family of standards. The system 200 may also include a cell access network 205 and a cell internet protocol (IP) network 210. The system 200 is a more specific application of the system 100 to a cellular network environment.

The cell access network 205 may include an eNodeB 215 and an access network 220. In an example, the eNodeB 215 may provide a variety of radio communication services to connect the UE 105 to voice and data served by the cell IP network 210. In an example, the access network 220 may provide the backhaul link between the eNodeB 215 and the cell IP network 210.

The cell IP network 210 may include a core network 225, a content delivery service 115 in the form of a PSS, and a device profile server 230. The content delivery service 115 may include a device profile (e.g., a current device capability profile) 240. In an example, the device profile may be a user agent profile (UAProf) according to a 3GPP family of standards. In an example, the content delivery service 115 may be arranged to retrieve an original profile from the device profile server 230. In an example, the original profile may be considered a first current profile (e.g., of a plurality when more than one modified profile is created). In an example, the original profile may be based on device capabilities of the UE 105. In an example, device profiles (e.g., original, current, or modified) confirm to a resource description framework according to a W3C family of standards. Further discussion of this device profile format is provided below with respect to FIG. 6.

In an example, the content delivery device 115 may include an internet protocol multimedia subsystem (IMS) PSS multimedia broadcast multicast service (MBMS), collectively known as IMS_PSS_MBMS, according to a 3GPP family of standards. In an example, the content presentation session may be an IMS session according to a 3GPP family of standards.

In an example, the content delivery service 115 may include a service discovery function (SDF). In this example, the modification module 135 can be arranged to communicate the difference to the SDF. In an example, the SDF is in accordance with a 3GPP family of standards.

The device profile server 230 may include a database of device profiles 235. In an example, the device profile server 230 maintains the original device profiles for long-term or distributed storage. This separation of data allows the device profile to be flexibly available to different wireless network devices while also providing flexibility during any given content presentation session.

Figure 3:
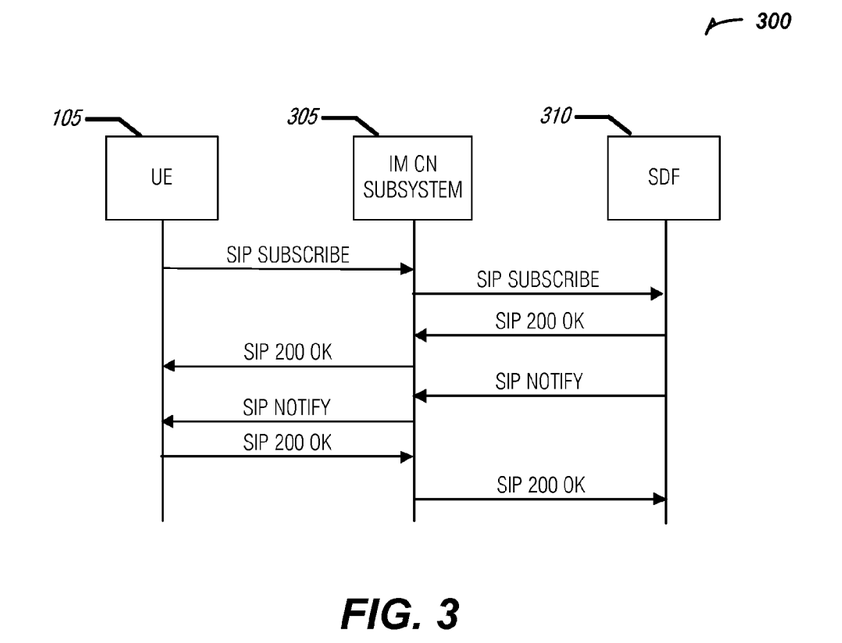
FIGS. 3-5 illustrate examples of systems of components and message exchanges for packet streaming service capability exchange for enhanced peripheral device, according to three embodiments.

FIG. 3 illustrates an example of a system 300 of components and message exchanges for PSS capability exchange for enhanced peripheral device, according to an embodiment. Components in the system 300 operate in accordance with a 3GPP family of standards. The system 300 may include a content consumer device 105 in the form of a UE, and a content delivery service 115 including an IP multimedia (IM) core network (CN) subsystem 305 and an SDF 310.

In IMS_PSS_MBMS, the UE 105 may send the difference between the content presentation device attribute and the corresponding content consumer device attribute in a SIP subscribe message to the IM CN subsystem 305 during service discovery. The IM CN subsystem 305 may then forward the SIP subscribe message to the SDF 310. The SDF 310 may determine proper service discovery information, for example, based on capabilities of the UE 105, the content presentation device 125, a user profile (e.g., Personalized Service Discovery), or any combination of the three. The SDF 305 may send a SIP NOTIFY message to the UE 105, with service discovery information, via the IM CN subsystem 305. This framework may enable optimized service discovery that uses device capability information of the UE 105, the content presentation device 125, or both in PSS and MBMS user services.

In an example, after a content presentation session (e.g., the IMS session), the UE 105 may also use SIP signaling to indicate updates to the current device profile, including any temporary adjustments to the device profile. In an example, the modified profile may be created from the current profile based on ProfDiff. This may be accomplished by refreshing the SIP subscription through further SIP subscribe messages that include the previously discussed attribute difference.

Figure 4:
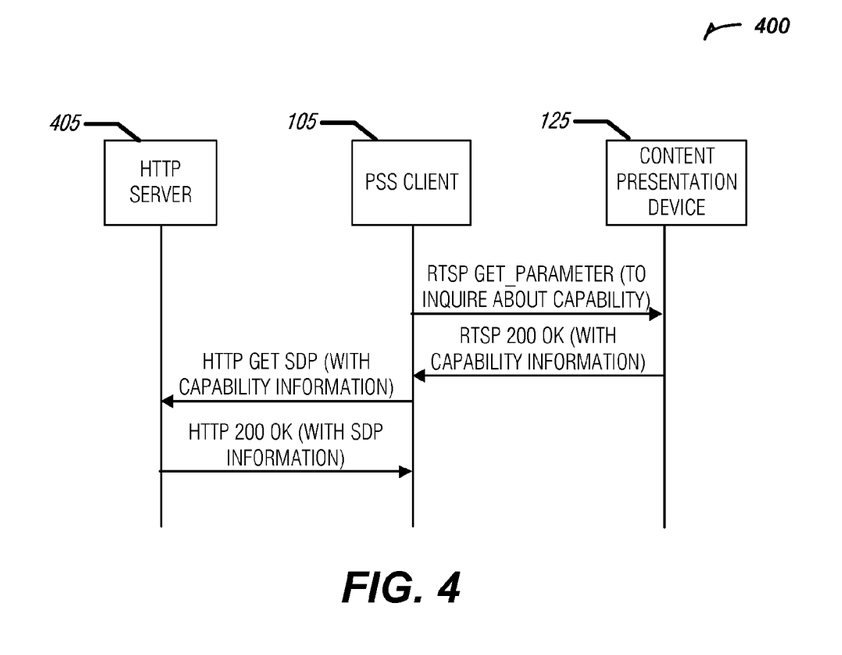

FIG. 4 illustrates an example of a system 400 of components and message exchanges for packet streaming service capability exchange for enhanced peripheral device, according to an embodiment. Components in the system 400 operate in accordance with a 3GPP family of standards. The system 400 may include a content consumer device 105 in the form of a PSS client, a content delivery service 115 in the form of an HTTP server, and a content presentation device 125.

In an example, if the PSS client 105 may have some prior knowledge about a file type it is attempting to retrieve (e.g., a file extension identifying an encoding format). When using session description protocol (SDP) with HTTP, the PSS client 105 may be arranged to include the attribute difference in an HTTP GET request. In an example, the illustrated signaling may be used to signal any temporary adjustments to the current profile, for example, based on ProfDiff. In this way, the HTTP server 115 may deliver a more optimal SDP to the PSS client 105 and the content presentation device 125. In an example, support for an RTSP-based streaming protocol may be present over the first communications module 110 link between the PSS client 105 and content presentation device 125.

Figure 5:
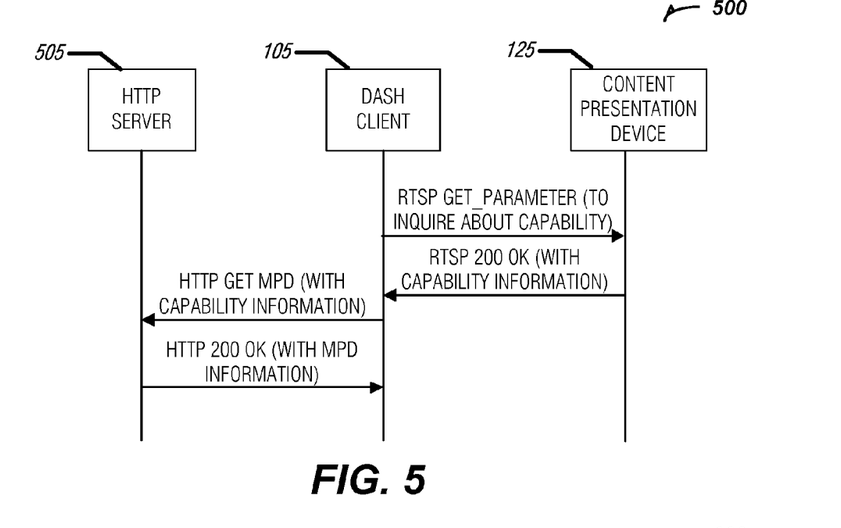

FIG. 5 illustrates an example of a system 500 of components and message exchanges for packet streaming service capability exchange for enhanced peripheral device, according to an embodiment. Components in the system 500 operate in accordance with a 3GPP family of standards. The system 500 may include a content consumer device 105 in the form of a dynamic adaptive streaming over HTTP (DASH) client, a content delivery service 115 in the form of an HTTP server, and a content presentation device 125.

When retrieving a media presentation description (MPD) using HTTP, the DASH client 105 may be arranged to include the attribute difference in an HTTP GET request. In an example, the illustrated signaling may be used to signal any temporary adjustments to the current profile, for example, based on ProfDiff. In this way, the HTTP server 115 may deliver a more optimal MPD to the DASH client 105 and the content presentation device 125. In an example, support for an HTTP-based streaming protocol may be present over the first communications module 110 link between the DASH client 105 and content presentation device 125.

Figure 6:
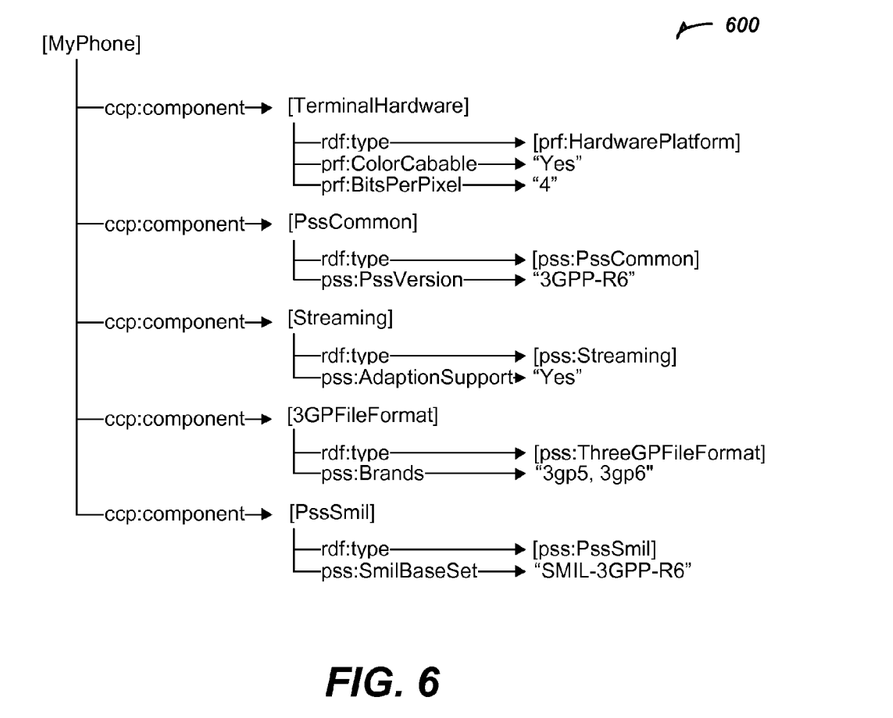
FIG. 6 illustrates an example of a user agent profile, according to an embodiment.

FIG. 6 illustrates an example of a user agent profile structure 300, according to an embodiment. The user profile structure 600 shown is related to A Composite Capabilities/Preference Profiles specification according to the World Wide Web Consortium (W3C). The user profile structure 600 is a resource description framework (RDF) document that follows the structure of the Composite Capability/Preference Profiles (CC/PP) W3C framework. In an example, the user profile structure 600 is in accordance with an Open Mobile Alliance User Agent Profile. In an example, the user agent profile structure 300 complies with version 2.0 of the Open Mobile Alliance User Agent Profile. Attributes may be used to specify device capabilities and preferences. The user agent profile 600 may include a set of attribute names, permissible values, and semantics comprising a CC/PP vocabulary. In an example, the CC/PP vocabulary may be defined by an RDF schema. In an example, for PSS and IMS_PSS_MBMS services, the CC/PP vocabulary may be reused. In an example, an additional service-specific vocabulary may be defined.

The following are examples of a number of profile attributes that may be represented in the user agent profile structure 300:
Attribute name: BitsPerPixel
Component: HardwarePlatform
Attribute description: The number of bits of color or grayscale information per pixel
Example: <BitsPerPixel>8</BitsPerPixel>
Attribute name: ColorCapable
Component: HardwarePlatform
Attribute description: Whether the device display supports color or not.
Example: <ColorCapable>Yes</ColorCapable>
Attribute name: PixelAspectRatio
Component: HardwarePlatform
Attribute description: Ratio of pixel width to pixel height
Example: <PixelAspectRatio>1×2</PixelAspectRatio>
Attribute name: PointingResolution
Component: HardwarePlatform
Attribute description: Type of resolution of the pointing accessory supported by the device.
Example: <PointingResolution>Pixel</PointingResolution>
Attribute name: Model
Component: HardwarePlatform
Attribute description: Model number assigned to the terminal device by the vendor or manufacturer
Example: <Model>Model B</Model>
Attribute name: Vendor
Component: HardwarePlatform
Attribute description: Name of the vendor manufacturing the terminal device
Example: <Vendor>TerminalManufacturer A</Vendor>
Attribute name: CPU
Component: HardwarePlatform
Attribute description: Name and model number of the device CPU.
Example: <CPU>Model A</CPU>
Attribute name: CPUMaximumFrequency
Component: HardwarePlatform
Attribute description: Processor maximum speed in MHz.
Example: <CPUMaximumFrequency>1333</CPUMaximumFrequency>
Attribute name: CcppAccept-Charset
Component: SoftwarePlatform
Attribute description: List of character sets the device supports
Example:

```
<CcppAccept-Charset>
    <rdf:Bag>
        <rdf:li>UTF-8</rdf:li>
    </rdf:Bag>
</CcppAccept-Charset>
```

Attribute name: CcppAccept-Encoding
Component: SoftwarePlatform
Attribute description: List of transfer encodings the device supports
Example:

```
<CcppAccept-Encoding>
    <rdf:Bag>
        <rdf:li>base64</rdf:li>
    </rdf:Bag>
</CcppAccept-Encoding>
```

Attribute name: CcppAccept-Language
Component: SoftwarePlatform
Attribute description: List of preferred document languages
Example:

```
<CcppAccept-Language>
    <rdf:Seq>
        <rdf:li>en</rdf:li>
        <rdf:li>se</rdf:li>
    </rdf:Seq>
</CcppAccept-Language>
```

Attribute name: DMCapable
Component: SoftwarePlatform
Attribute description: Indicates whether the device provides Device Management capabilities.

Example: <DMCapable>Yes</DMCapable>
Attribute name: DMVersion
Component: SoftwarePlatform
Attribute description: Version of the Device Management (DM) capability within the device
Example: <DMVersion>1.2</DMVersion>
Attribute name: CurrentBearerService
Component: NetworkCharacteristics
Attribute description: The bearer on which the current session was opened, e.g., UMTS, HSDPA, WiFi, etc.
Example: <CurrentBearerService>UMTS</CurrentBearerService>

Figure 7:
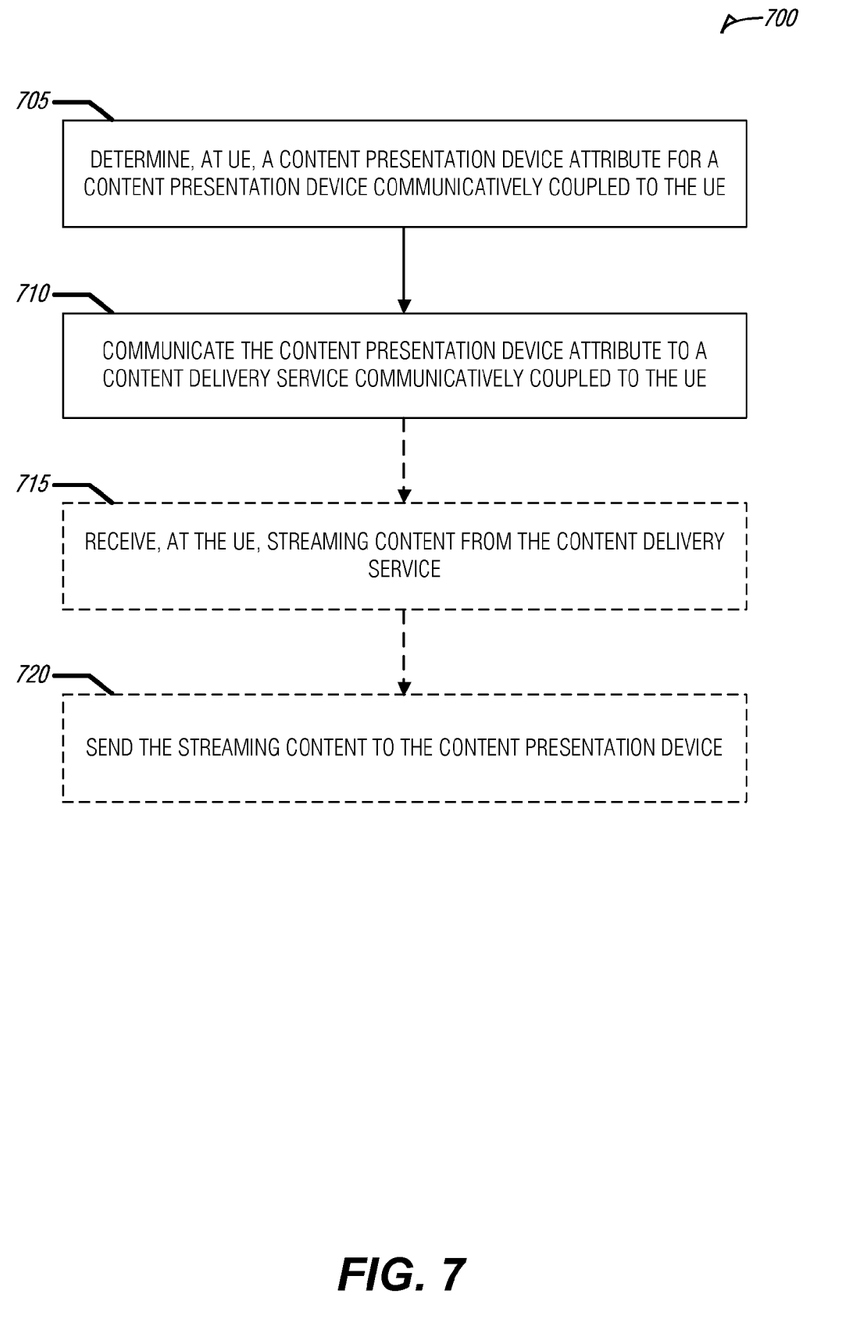
FIG. 7 illustrates an example of a method for packet streaming service capability exchange for enhanced peripheral device support, according to an embodiment.

FIG. 7 illustrates an example of a method 700 for packet streaming service capability exchange for enhanced peripheral device support, according to an embodiment.

At operation 705, A content presentation device 125 attribute may be determined. The determination may be made at a content consumer device 105 (e.g., a UE). The content presentation device 125 may be communicatively coupled to the UE.

At operation 710, the content presentation device attribute may be communicated to a content delivery service 115 communicatively coupled to the content consumer device 105. In an example, the communication occurs either prior to or concurrent with initiating the content presentation session that is discussed below. In an example, the communication occurs after initiating the content presentation session that is discussed below. In an example, the content consumer device 105 may indicate, included in the communication, that the content presentation device attribute is temporary. In an example, a temporary presentation device attribute is applicable for a predetermined period of time. In an example, the predetermined period of time begins with the communication. In an example, the predetermined period of time ends with the end of the content presentation session that is discussed below. In an example, the predetermined period of time ends with a user defined time period, such as the end of the day, while a current connection is maintained, etc.

In an example, the content consumer device 105 may initiate the content presentation session. In an example, the content presentation session may include performance of the following operations 715 and 720.

At operation 715, streaming content may be received at the content consumer device 105 from the content delivery service 115.

Figure 8:
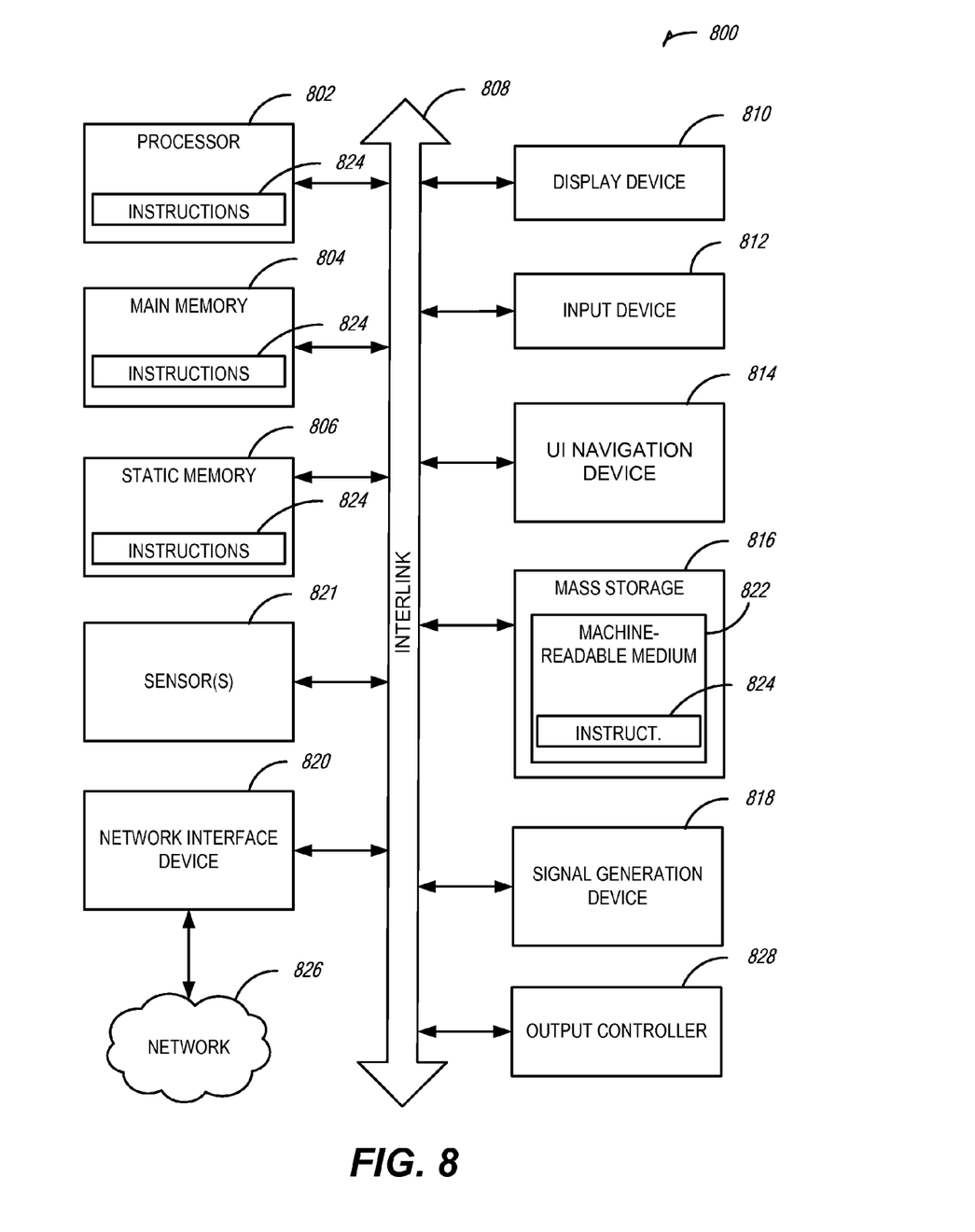
FIG. 8 is a block diagram illustrating an example of a machine upon which one or more embodiments may be implemented.

At operation 720, the content consumer device 105 may send the streaming content to the content presentation device 125 to be rendered FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 811 (e.g., a mouse). In an example, the display unit 810, input device 817 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR)) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) that arranged to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Additional Notes & Examples

Example 1 includes subject matter (such as a device, apparatus, or user equipment (UE)) comprising a first communications module communicatively coupled to a content delivery service, a second communications module communicatively coupled to a content presentation device, a difference module arranged to determine a difference between a content presentation device attribute for the content presentation device and a corresponding device attribute in a device profile of the UE, and a modification module arranged to communicate the difference to the content delivery service via the first communications module, the difference arranged to modify a session parameter for a content presentation session.

In Example 2, the subject matter of Example 1 may optionally include the difference module being arranged to determine the difference to the content delivery service based on and in response to receiving user input.

In Example 3 the subject matter of any one or both of Examples 1 and 2 may optionally include the modification module being arranged to communicate the difference to the content delivery service via the first communications module in response to a determination of the content presentation device attribute.

In Example 4, the subject matter of Example 3 may optionally include the difference module being arranged to interrogate, via the second communications module, the content presentation device to make the determination.

In Example 5 the subject matter of any one or more of Examples 1-4 may optionally include the difference module being arranged to determine the difference during a content presentation session. The communicated difference may be arranged to modify one or more session parameters for the content presentation session by the content presentation service.

In Example 6, the subject matter of Example 5 may optionally include the content presentation session being an internet protocol multimedia subsystem (IMS) session according to a 3rd Generation Partnership Project (3GPP) family of standards.

In Example 7, the subject matter of Example 6 may optionally include the modification module being arranged to initiate a session initiation protocol (SIP) subscribe message to the content delivery service, the content presentation session arranged to begin after receipt of a SIP notify message by the UE.

In Example 8, the subject matter of any one or more of Examples 5-7 may optionally include the difference being arranged to modify the one or more session parameters until at least one of the content presentation session ends or a subsequent difference is communicated to the content delivery service, the subsequent difference corresponding to the difference.

In Example 9, the subject matter of any one or more of Examples 1-8 may optionally include the modification module being arranged to communicate the difference to the content delivery service using a real-time streaming protocol (RTSP) describe message according to a 3GPP family of standards.

In Example 10, the subject matter of any one or more of Examples 1-9 may optionally include the modification module being arranged to communicate the difference to the content delivery service using a hypertext transfer protocol (HTTP) get request.

In Example 11, the subject matter of any one or more of Examples 1-10 may optionally include the content delivery service including a service discovery function (SDF), and, to communicate the difference to the content delivery service, the modification module may be arranged to communicate with the SDF.

In Example 12, the subject matter of any one or more of Examples 1-11 may optionally include the UE conforming to a 3GPP family of standards.

In Example 13, the subject matter of any one or more of Examples 1-12 may optionally include the content delivery service comprising a packet-switched streaming (PSS) service according to a 3GPP family of standards.

In Example 14, the subject matter of any one or more of Examples 1-13 may optionally include the content delivery service comprising an IMS-based packet-switched streaming multimedia broadcast multicast service (IMS_PSS_MBMS) according to a 3GPP family of standards.

In Example 15, the subject matter of any one or more of Examples 1-14 may optionally include the difference module is arranged to determine a plurality of differences between content presentation device attributes for the content presentation device and corresponding device attributes in the device profile of the UE, the plurality of differences including the difference. The modification module may also be arranged to communicate the plurality of differences to the content delivery service via the first communications module, the plurality of differences each arranged to modify one or more session parameters for a content presentation session.

In Example 16, the subject matter of any one or more of Examples 1-15 may optionally include the device profile being a user agent profile (UAProf) according to a 3GPP family of standards.

In Example 17, the subject matter of any one or more of Examples 1-16 may optionally include the difference corresponding to at least one of a name and number of a device central processing unit (CPU), a CPU maximum speed in clock cycles per second, an indication whether a device provides device management (DM) capabilities, a version of a DM capability of a device, a bearer on which a current content presentation session was opened, pre-decoder buffer size, initial buffering period, decoder capability, display properties, streaming method, adaptation support information, quality of experience (QoE) support information, extended real time transport control protocol (RTCP) reporting support, or a fast content switching support.

In Example 18, the subject matter of any one or more of Examples 1-17 may optionally include the first communications module being arranged to communicatively couple to the content delivery service via a cellular network according to a 3GPP family of standards.

Example 19 may include, or may optionally be combined with the subject matter of any one or more of Examples 1-15 to include, subject matter (such as a method, means for performing acts, or machine readable medium including instructions that, when performed by a machine cause the machine to perform acts) comprising to receive a profile difference (ProfDiff) from a user equipment (UE), the ProfDiff including a device attribute, modify a current profile with the device attribute to create a modified profile, and determine whether a content presentation session parameter will change based on the modified profile.

In Example 20, the subject matter of Example 19 may optionally include a corresponding device attribute in the current profile that corresponds to the device attribute is not represented in the current profile, and to modify the current profile with the device attribute may optionally include adding the device attribute to the current profile to create the modified profile.

In Example 21, the subject matter of any one or both of claims 19 and 20 may optionally include a corresponding device attribute in the current profile that corresponds to the device attribute is represented in the current profile, and, to modify the current profile with the device attribute may optionally include changing the corresponding device attribute to the device attribute to create the modified profile.

In Example 22, the subject matter of any one or more of Examples 19-21 may optionally include, to receive the ProfDiff includes receipt of a content presentation session request to which the ProfDiff applies.

In Example 23, the subject matter of Example 22 may optionally include discarding the modified profile at the end of the content presentation session to which the ProfDiff applies.

In Example 24, the subject matter of any one or more of Examples 19-23 may optionally include retrieving an original profile from a device profile server, the original profile being a first current profile, and the original profile based on device capabilities of the UE.

In Example 25, the subject matter of any one or more of Examples 19-24 may optionally include the current profile and the modified profile conforming to a resource description framework according to a W3C family of standards.

In Example 26, the subject matter of any one or more of Examples 19-25 may optionally include modifying the content presentation session parameter of an in-progress content presentation session in response to the determination that the content presentation session parameter will change based on the modified profile.

Example 27 may include, or may optionally be combined with the subject matter of any one or more of Examples 1-15 to include, subject matter (such as a method, means for performing acts, or machine readable medium including instructions that, when performed by a machine cause the machine to perform acts) comprising determining, at a user equipment (UE), a content presentation device attribute for a content presentation device communicatively coupled to the UE, and communicating the content presentation device attribute to a content delivery service communicatively coupled to the UE.

In Example 28, the subject matter of Example 27 may optionally include initiating a content presentation session. The content presentation session may comprise receiving, at the UE, streaming content from the content delivery service, and sending the streaming content to the content presentation device.

In Example 29, the subject matter of Example 28 may optionally include, where communicating the content presentation device attribute occurs at least one of prior to or concurrent with initiating the content presentation session.

In Example 30, the subject matter of Examples 28 may optionally include, where communicating the content presentation device attribute occurs after initiating the content presentation session and during the content presentation session.

In Example 31, the subject matter of any one or more of Examples 27-30 may optionally include, where communicating the content presentation device attribute includes indicating that the content presentation device attribute is temporary, a temporary presentation device attribute being applicable for a predetermined time period.

The above detailed description includes references to the accompanying drawings, which form a part of the detailed description. The drawings show, by way of illustration, specific embodiments that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A user equipment (UE) comprising:
   a first communications module configured to communicatively couple to a content delivery service;
   a second communications module configured to communicatively couple to a content presentation device, wherein the content presentation device is a peripheral device of the UE;
   a difference module arranged to determine a difference between a content presentation device attribute for the content presentation device and a corresponding device attribute in a device profile of the UE, the device profile conforming to a user agent profile (UAProf) compatible with a 3rd Generation Partnership Project (3GPP) Release 10 family of standards; and
   a modification module arranged to communicate, in a profile difference (ProfDiff) message in a real-time streaming protocol (RTSP) describe message of a content presentation session request for a content presentation session, the difference to the content delivery service via the first communications module, the difference arranged to modify a session parameter for the content presentation session until the content presentation session ends, the difference including a device management (DM) capability field and a DM capability version field, the UE and RTSP describe message being compatible with the 3GPP Release 10 family of standards, and the ProfDiff conforming to a 2004 W3C resource description framework (RDF) schema.

2. The UE of claim 1, wherein the difference module is arranged to determine the difference to the content delivery service based on and in response to receiving user input.

3. The UE of claim 1, wherein the modification module is arranged to communicate the difference to the content delivery service via the first communications module in response to a determination of the content presentation device attribute.

4. The UE of claim 3, wherein the difference module is arranged to interrogate, via the second communications module, the content presentation device to make the determination.

5. The UE of claim 1, wherein the difference module is arranged to determine the difference during a content presentation session; and
   wherein the communicated difference is arranged to modify one or more session parameters for the content presentation session by the content presentation service.

6. The UE of claim 5, wherein the content presentation session is an internet protocol multimedia subsystem (IMS) session according to the 3GPP Release 10 family of standards.

7. The UE of claim 6, wherein the modification module is arranged to initiate a session initiation protocol (SIP) subscribe message to the content delivery service, the content presentation session arranged to begin after receipt of a SIP notify message by the UE.

8. The UE of claim 5, wherein the difference is arranged to modify the one or more session parameters until a subsequent difference is communicated to the content delivery service, the subsequent difference corresponding to the difference.

9. The UE of claim 1, wherein the modification module is arranged to communicate the difference to the content delivery service using a hypertext transfer protocol (HTTP) get request.

10. The UE of claim 1, wherein the content delivery service includes a service discovery function (SDF); and
    wherein to communicate the difference to the content delivery service the modification module is arranged to communicate with the SDF.

11. The UE of claim 1, wherein the UE conforms to the 3GPP Release 10 family of standards.

12. The UE of claim 1, wherein the content delivery service comprises a packet-switched streaming (PSS) service according to the 3GPP Release 10 family of standards.

13. The UE of claim 1, wherein the content delivery service comprises an IMS-based packet-switched streaming multimedia broadcast multicast service (IMS_PSS_MBMS) according to the 3GPP Release 10 family of standards.

14. The UE of claim 1, wherein the difference module is arranged to determine a plurality of differences between content presentation device attributes for the content presentation device and corresponding device attributes in the device profile of the UE, the plurality of differences including the difference; and
    the modification module is arranged to communicate the plurality of differences to the content delivery in the ProfDiff, the plurality of differences each arranged to modify one or more session parameters for the content presentation session.

15. The UE of claim 1, wherein the difference corresponds to at least one of a name and number of a device central processing unit (CPU), a CPU maximum speed in clock cycles per second, an indication whether a device provides a bearer on which a current content presentation session was opened, pre-decoder buffer size, initial buffering period, decoder capability, display properties, streaming method, adaptation support information, quality of experience (QoE) support information, extended real time transport control protocol (RTCP) reporting support, or a fast content switching support.

16. The UE of claim 1, wherein the first communications module is arranged to communicatively couple to the content delivery service via a cellular network according to the 3GPP Release 10 family of standards.

17. The UE of claim 1, including a touch screen display user interface navigation device.

18. A non-transitory computer-readable medium comprising instructions that, when executed by a machine, cause the machine to:
receive a profile difference (ProfDiff) in a real-time streaming protocol (RTSP) describe message of a content presentation request for a content presentation session from a user equipment (UE), the ProfDiff including a device attribute, the device attribute being for a peripheral device of the UE, the device attribute including a device management (DM) capability field and a DM capability version field, the RTSP describe message being compatible with a 3rd Generation Partnership Project (3GPP) Release 10 family of standards, the ProfDiff conforming to a 2004 W3C resource description framework (RDF) schema; modify a current profile with the device attribute to create a modified profile, the current profile conforming to a user agent profile (UAProf) compatible with the 3GPP Release 10 family of standards: and change a content presentation session parameter based on the modified profile until the content presentation session ends, at which point the modified profile is discarded.

19. The computer-readable medium of claim 18, wherein a corresponding device attribute in the current profile that corresponds to the device attribute is not represented in the current profile; and
wherein to modify the current profile with the device attribute includes adding the device attribute to the current profile to create the modified profile.

20. The computer-readable medium of claim 18, wherein a corresponding device attribute in the current profile that corresponds to the device attribute is represented in the current profile; and
wherein to modify the current profile with the device attribute includes changing the corresponding device attribute to the device attribute to create the modified profile.

21. The computer-readable medium of claim 18, comprising instructions that, when executed by the machine, cause the machine to retrieve an original profile from a device profile server, the original profile being a first current profile, and the original profile based on device capabilities of the UE.

22. The computer-readable medium of claim 18, comprising instructions that, when executed by the machine, cause the machine to modify the content presentation session parameter of an in-progress content presentation session in response to a determination that the content presentation session parameter will change based on the modified profile.

23. A method comprising: receiving a profile difference (ProfDiff) in a real-time streaming protocol (RTSP) describe message of a content presentation request for a content presentation session from a user equipment (UE), the ProfDiff including a device attribute, the device attribute being for a peripheral device of the UE, the device attribute including a device management (DM) capability field and a DM capability version field, the RTSP describe message being compatible with a 3rd Generation Partnership Project (3GPP) Release 10 family of standards, the ProfDiff conforming to a 2004 W3C resource description framework (RDF) schema; modifying a current profile with the device attribute to create a modified profile, the current profile conforming to a user agent profile (UAProf) compatible with the 3GPP Release 10 family of standards; and changing a content presentation session parameter based on the modified profile until the content presentation session ends.

24. The method of claim 23, wherein a corresponding device attribute in the current profile that corresponds to the device attribute is not represented in the current profile; and
wherein modifying the current profile with the device attribute includes adding the device attribute to the current profile to create the modified profile.

25. The method of claim 23, wherein a corresponding device attribute in the current profile that corresponds to the device attribute is represented in the current profile; and
wherein modifying the current profile with the device attribute includes changing the corresponding device attribute to the device attribute to create the modified profile.

26. The method medium of claim 23, comprising retrieving an original profile from a device profile server, the original profile being a first current profile, and the original profile based on device capabilities of the UE.

27. The method medium of claim 23, comprising modifying the content presentation session parameter of an in-progress content presentation session in response to a determination that the content presentation session parameter will change based on the modified profile.

* * * * *